July 7, 1925.
W. S. SHEPPARD
AIRCRAFT OF THE AEROPLANE OR HYDROAEROPLANE TYPE
Filed April 2. 1920
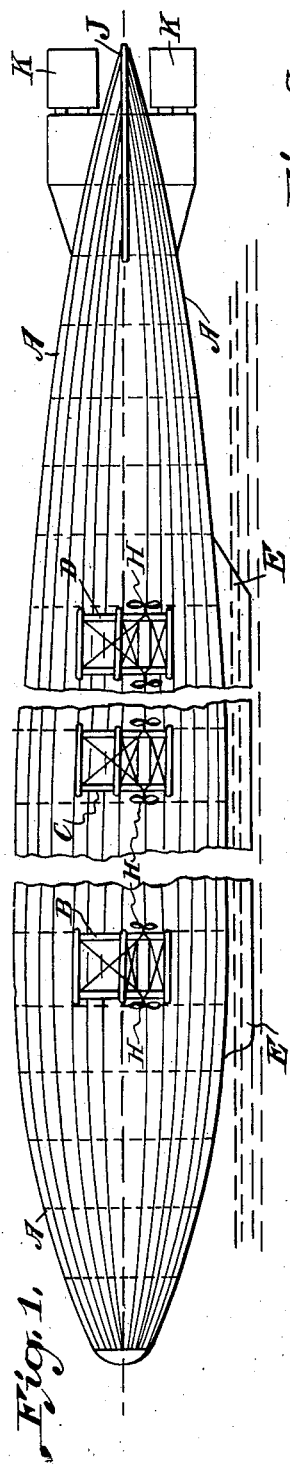
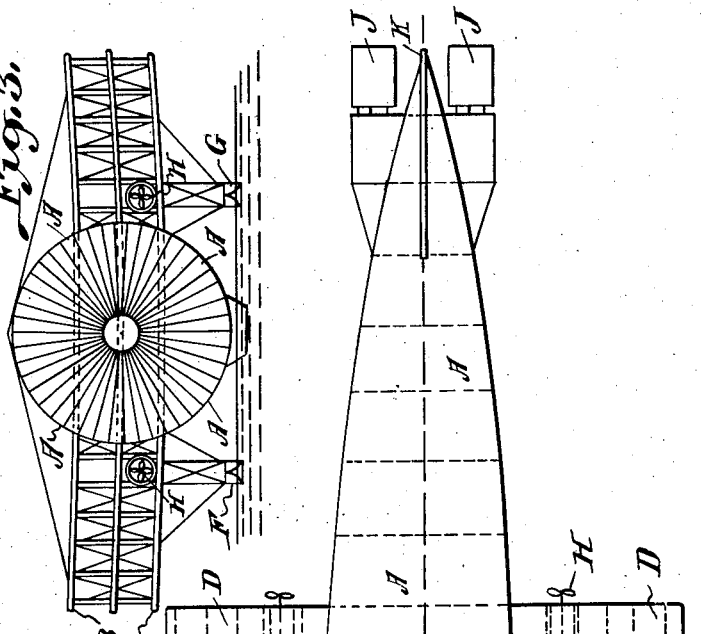
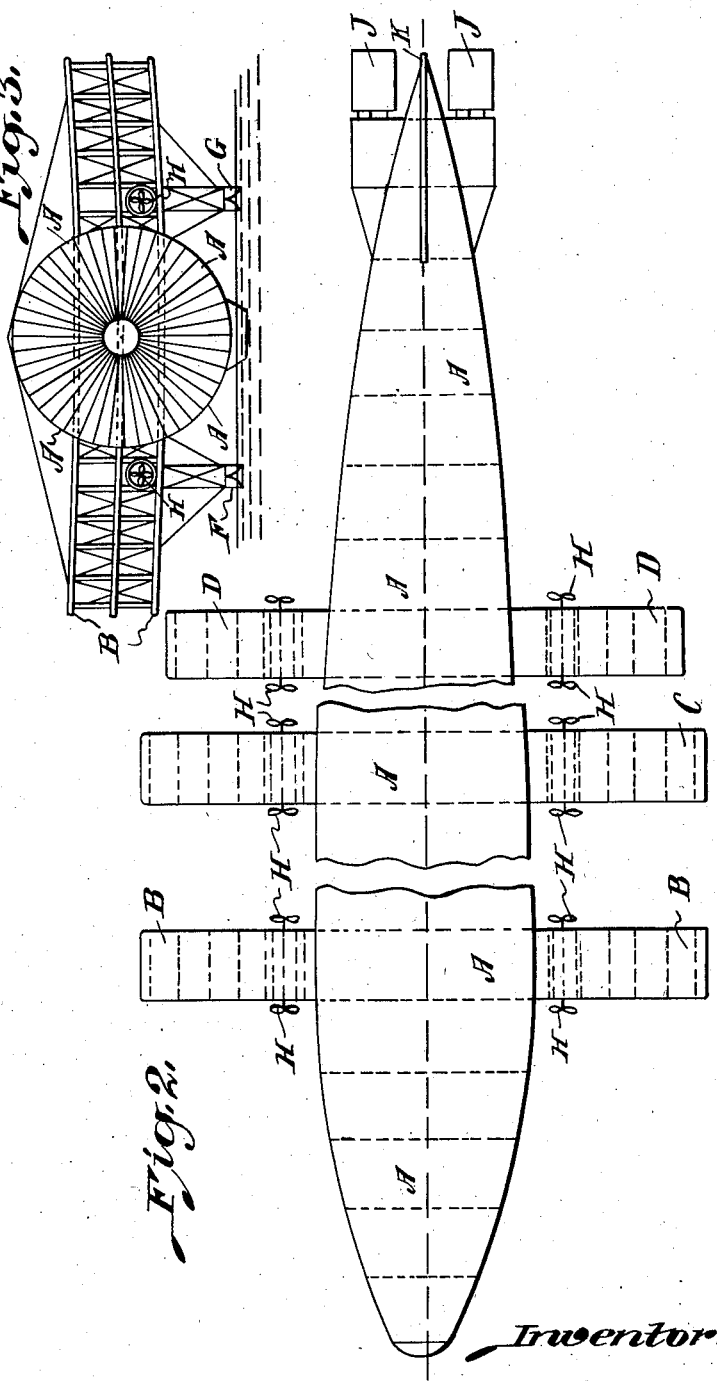
Inventor:
William Sholts Sheppard
BY: Francis E. Boyce
ATTORNEY.

Patented July 7, 1925.

1,544,946

UNITED STATES PATENT OFFICE.

WILLIAM SHOLTS SHEPPARD, OF CORSTORPHINE, SCOTLAND.

AIRCRAFT OF THE AEROPLANE OR HYDROAEROPLANE TYPE.

Application filed April 2, 1920. Serial No. 370,647.

*To all whom it may concern:*

Be it known that I, WILLIAM SHOLTS SHEPPARD, a subject of the King of Great Britain and Ireland, residing at Gavarnie, Kaimes Road, Corstorphine, county of Midlothian, Scotland, have invented new and useful Improvements in Aircraft of the Aeroplane or Hydroaeroplane Type, of which the following is a specification.

My said invention relates to aircraft of the aeroplane or hydroaeroplane type, that is to say, machines of the heavier than air type, and has for its object to provide means whereby the lifting capacity, stability and buoyancy of an aeroplane, or hydroaeroplane, is substantially increased.

In carrying out my invention, the aeroplane, or hydroaeroplane, has applied to it a lighter than air fuselage consisting of a gas containing receptacle, or receptacles, the planes and float or under-carriage being built into and forming integral parts of said fuselage, in such a manner that the machine is a heavier than air machine with a lighter than air fuselage. In a hydroaeroplane the floats may, if desired, be used as additional gas receptacles.

In order that my said invention and the manner of performing the same may be properly understood, I hereto append a sheet of explanatory drawings to be hereinafter referred to in describing my invention.

Figures 1, and 2, are respectively a diagrammatic side elevation, and a plan of one example of an aircraft adapted to rise from, and land on, the water. Figure 3 is an end elevation. In these drawings the same reference letters are used to mark the same or like parts wherever they are repeated.

As shown in the drawings, the fuselage of the machine consists of a single gas-containing receptacle, or structure A, provided with three sets of triplanes B, C and D, and a boat-like structure E, and supplementary floats F and G, the latter being placed under each set of triplanes. The machine is also provided with propellers H, and the usual horizontal and vertical rudders J and K.

The number of planes employed, and their position relative to the fuselage, may be varied as found most suitable in practice, and if desired, more than one gas containing receptacle may be employed, and in addition to the usual propellers, or tractors, helicopters may also be employed. If desired, part of the dead weight may consist of removable ballast.

By constructing an aircraft, as just described, i. e., the practical application of the combined features underlying lighter than air and heavier than air craft, the lifting power of the machine is substantially increased, as the lifting power of the total volume of gas may be such as to approximately cover or nearly equalize the net weight of the machine, so that the load on the engine and planes is reduced to the weight of the fuel, passengers and goods, plus the required speed of the machine.

What I claim as my invention is:—

An aeroplane comprising a frame, a gas receptacle supported by said frame, a plurality of planes formed integral with said frame and extending laterally therefrom, said planes being distributed uniformly along the length of the frame, and a float supported at the bottom of the frame, said receptacle being of sufficient size to nearly equalize the dead load of the machine.

In testimony whereof I have signed my name to this specification in the presence of two subscribing witnesses.

WILLIAM SHOLTS SHEPPARD

Witnesses:
 H. TOBEY MOOERS,
 HELEN SUTHERLAND.